United States Patent Office 3,270,001
Patented August 30, 1966

3,270,001
PROCESS OF TREATING LIGNIN-CONTAINING AQUEOUS LIQUOR
Tatsuo Morimoto, Befu-cho, Kakogawa, Japan, assignor to Taki Fertilizer Manufacturing Co., Ltd.
No Drawing. Filed July 22, 1963, Ser. No. 296,501
8 Claims. (Cl. 260—124)

The present invention relates to the separation or removal of lignin from an aqueous solution containing lignin in the water soluble form. More particularly the present invention relates to the use of particular basic salts of aluminium or iron as a precipitating or coagulating agent in separating or removing lignin from an aqueous solution containing lignin in the water soluble form.

As is well known, lignin is present in the wood and when the wood is treated with a chemical treating liquid such as in the manufacture of paper pulp, wood digestion, wood saccharification, etc. the lignin substance of the wood is extracted with and goes into the treating liquid so that the waste liquor resulting from the chemical treatment of wood contains, without exception, a considerable amount of lignin in the form as dissolved therein. Thus, a most typical waste liquor, namely waste sulphite liquor resulting from the manufacture of paper pulp by the sulphite process usually contains about 3 to 11% by weight of salts (e.g. calcium, sodium, ammonium, magnesium, etc.) of ligninsulphonic acid.

For one or more of the following reasons it is sometimes desired to separate or remove lignin from lignin-containing waste liquor. Namely, as is well known in the art, lignin or its derivatives is useful material for various uses including the manufacture of plastic materials, as material for producing vanillin, as tanning agents, cement additives, etc. When a sulphite waste liquor is to be utilized as a medium for alcohol fermentation, yeast fermentation and the like it is preferable to remove lignin from the waste liquor to carry out the fermentation more effectively. Furthermore, a waste liquor containing lignin and resulting from the wood processing mill is dark in color due to the lignin contained therein and therefore unless such lignin is removed the waste liquor would contaminate the river, lake, sea, etc., where the waste liquor is discharged.

In order to remove or separate lignin from such lignin-containing waste liquor there have been some proposals, among which most well known is the so-called Marathon-Howard process (U.S. Patent No. 1,699,845) which utilizes a caustic lime as a precipitating agent. This process, however, has various drawbacks in that it requires a large and expensive apparatus, it requires three-step operations which are complicated and time consuming, it can not be carried out at ordinary or room temperature, it requires rather delicate pH control which is difficult, etc. It has also been proposed to concentrate the waste liquor and to evaporate the same to dryness. Apparently this method requires a great amount of heat and furthermore it is impossible to selectively recover lignin with excellent purity.

It is an object of this invention to provide a novel method wherein lignin in a lignin-containing aqueous solution can be easily and selectively precipitated.

It is another object of this invention to provide a novel method for precipitating lignin from a lignin-containing aqueous solution, wherein the lignin is easily precipitated, by the addition of certain precipitating agents, with excellent selectivity, yield, purity and in the form which is low in water content and easy in filtration.

It is still another object of this invention to provide a novel method for effectively precipitating lignin from a lignin-containing aqueous solution, said method being economical in that only a small amount of inexpensive precipitating agent is required, operation is quite simple and no expensive apparatus is required.

Briefly these and other objects of this invention are attained by adding to a lignin-containing aqueous liquor a basic salt of the formula:

$$M_n(OH)_m X_{3n-m}$$

wherein M is a metal selected from Al and trivalent Fe, $n$ is a number from 1 to 20 inclusive, X is a monovalent anion, $3n > m$ and the chemical equivalent ratio M/X is from about 1.5 to about 200.

The method of this invention is applicable to any aqueous liquor containing lignin in the form as dissolved therein. Thus, for example, the method of this invention is applicable to waste sulphite liquor and other liquor resulting from the manufacture of pulp by the so-called sulphite process, alkali process, semi-chemical process, etc. In any case such liquor should contain lignin in the form as dissolved therein, such as in the form of lignin, ligninsulphonic acid, lignincarboxylic acid or their salts (e.g. salt of calcium, sodium, ammonium, magnesium, etc.), thiolignin and other lignin derivatives which are soluble in water. Therefore the term "lignin" or the like as used to designate that dissolved in the liquid to be treated is intended to mean broadly those lignin or lignin derivatives which are soluble in water, although the present invention is most conveniently applicable to those solutions (e.g. waste sulphite liquor) containing ligninsulfonic acid or lignincarboxylic acid as the calcium or magnesium salt.

In the industrial application of the method of this invention the lignin content in the liquor to be treated may be from as low as 0.1% to 20% or higher. Most preferably the lignin content is from about 4% to about 10%. Since the ligninsulfonate content in usual sulphite waste liquor resulting from most pulping mills is about 3–11%, mostly about 7%, the method of this invention is convenient in applying to waste sulphite liquor. The solid content and its amount other than that of lignin in the liquor to be treated does not unduly affect the efficiency of the method of this invention.

The pH of the lignin-containing liquor to be treated may vary over a wide range, although a pH within the range from 2 to 9, more particularly 3–6 is preferable. Since the pH of usual waste sulphite liquor resulting from ordinary pulping mills is between about 2 and 3 it preferable to adjust the same to a pH between 3 and 6 before or at the same time with the treatment of this invention.

The important feature of the method of this invention is to add to the lignin-containing aqueous liquor a particular precipitating (or coagulating) agent or aid selected from the basic salts of the following formula:

$$M_n(OH)_m X_{3n-m} \qquad (I)$$

wherein M is a metal selected from Al and trivalent Fe, $n$ is a number from 1 to 20 inclusive, X is a monovalent anion, $3n > m$ and the chemical equivalent ratio M/X is from about 1.5 to about 200. The symbol $m$ in the Formula I should satisfy the relation $3n > m$ and the chemical equivalent ratio M/X=1.5–200. Preferably, the chemical equivalent ratio M/X is from 1.5 to 6, more preferably from 3 to 6 inclusive. As for M, aluminium Al is preferred to iron Fe. Examples of anions represented by X in the Formula I are Cl, Br, I, $NO_3$, $CH_3COO$, among which Cl and $NO_3$ are most preferred. Where M is Al, $n$ is from 1 to 20 (preferably 4–10), while when M is trivalent Fe, $n$ is preferable to be 1 to 2 inclusive.

The compounds of the Formula I can be prepared by any suitable method known to those skilled in the art, e.g. by those methods as described in U.S. Patent No.

2,196,016, British Patent No. 873,048 and Japanese Patent No. 298,061.

The optimum amount of the basic salt to be added to a lignin-containing aqueous solution depends upon the amount of the lignin as contained in the solution. Generally it is satisfactory to add the basic salt in an amount of from ½ to ⅒ part, preferably ⅓–⅐ part (calculated as $Al_2O_3$) per one part of the solid lignin content in the aqueous solution to be treated.

If desired a mixture of different basic salts within the Formula I may be employed. Thus, for example, it is possible to use a mixture of the basic iron salt(s) and basic aluminium salts(s). The basic salt may be added in the form of solid or in the form of an aqueous solution, the latter being preferred.

While slowly stirring the lignin-containing solution the basic salt is added thereto continuously or intermittently.

The temperature at which the treatment is carried out may vary over a wide range, e.g. from 0° C. to 100° C. (boiling point). However, it is preferable to heat the mixture to promote or accelerate the precipitation and coagulation of the lignin substance. Furthermore, when the treatment is effected at a higher temperature the filtration of the resulting precipitate can be carried out more easily. Thus as compared with the case where the treatment is carried out at 16° C., the time required for the filtration of the resulting precipitate is shortened to about half and to about ⅕ when the same treatment is carried out at 60° C. and 80° C. respectively. A high temperature is also preferred because the filter cake obtained contains a smaller amount of water. Thus it is preferable to carry out the treatment at a temperature of from 50° C. to 100° C.

The treatment may be continued until the desired precipitation occurs. Usually a time of treatment for about 30 minutes or less is sufficient.

During the treatment the lignin substance present in the solution precipitates and coagulates together with the basic salt added.

While I do not limit the invention to the particular mechanism it is believed that the precipitation or coagulation of the lignin substance according to this invention occurs by the following mechanism.

Taking as an example a basic aluminium chloride, $Al_n(OH)_mCl_{3n-m}$ (hereinafter refered to as BAC), this compound has, unlike ordinary aluminium chloride, a complex ion structure. When this compound is added to a lignin-containing solution, there occurs an ion exchange reaction between anion of BAC and anion (e.g. lignosulfonic ion or lignocarboxylic ion) of the lignin substance to form hydrophobic coagulate which is a water insoluble basic lignin compound. This reaction may be exemplified by the following equation when calcium lignosulfonate is precipitated by the addition of basic aluminium chloride:

$$(LigSO_3)_2Ca + 2Al(OH)_2Cl \rightarrow 2LigSO_3Al(OH)_2 + CaCl_2$$

The precipitate may be separated from the solution by any suitable means such as a filter press. Due to the removal of the lignin substance the filtrate is clear and light in color. The filter cake usually contains about 60 to 80% of water and may be dried to obtain a dried solid material consisting predominantly of insoluble lignin derivatives which can be easily pulverized to powder useful as fillers for synthetic and natural rubber and synthetic resins and also for dispersing agents for various uses.

It has also been found that if an alkali metal salt having a monovalent anion is added to the liquor to be treated the amount of the basic salt to be used may be greatly reduced. Preferable examples of the alkali metal salts are $NaCl$, $KCl$, $KNO_3$, $NaNO_3$, etc. The alkali metal salt may be added in the form of a solution or solid, the former being preferred. The alkali metal salt may be added to the lignin-containing liquor prior to adding thereto the before mentioned basic salt, or the alkali metal salt may be mixed with the basic salt to be added to the lignin-containing liquor, or the alkali metal salt may be added to the lignin-containing liquor together with the basic salt. The amount of the alkali metal salt to be added may be about 0.1 to about 10% (preferably about 0.5–2.0%) based on the weight of the solid lignin content in the lignin-containing liquid to be treated. Thus, when the alkali metal salt in a preferable amount mentioned above is employed the amount of the basic salt may be about a half as compared with the case where no such alkali metal salt is added, to obtain substantially the same degree of precipitation of the lignin substance.

Therefore, in a preferred embodiment of the invention, not only a basic aluminium (or iron) salt but also an alkali metal salt is added to a lignin-containing liquor.

The advantages of the method of this invention are, among others, as follows:

(1) The basic aluminium or iron salts used in this invention are readily available and inexpensive.

(2) Almost all of the lignin substance can be separated and the filtrate is clear (refer to examples).

(3) The lignin substance is selectively precipitated without noticeable coprecipitation of other organic substances such as sugars (refer to examples).

(4) Usual waste sulphite liquor can be treated as such directly without any complicated pretreatment.

(5) The precipitate can readily be filtered.

(6) The water content of the filter cake is low.

(7) No special and expensive apparatus is required.

The following examples illustrate the invention but not by way of limitation. In these examples the degree of precipitation was determined by the ultraviolet ray (250–300 m$\mu$) absorption of the lignin-containing liquor with a spectrophotometer before and after the treatment. Since lignin substance has a maximum absorption at or about 280 m$\mu$ the degree of removal of lignin substance can be calculated by comparing the absorbency around the mentioned wave length by the liquor before the treatment and that after the treatment.

To determine the total amount of orangic substances present in the liquor, the consumption of potassium permanganate was measured for both the initial liquor and the treated liquor.

To determine the clarity or transparency the transmittancy power of the visible 550 m$\mu$ band was measured with EPU-2A type spectrophotometer (made by K. K. Hitachi Seisakusho, Tokyo, Japan), in respect of the liquor both before and after the treatment.

*Example 1*

100 cc. of waste sulphite liquor (pH adjusted to 4, total solid content 13.4 g./100 cc.) containing 8% by weight of calcium lignosulphonate was employed. While stirring and maintaining at 25° C. basic aluminium chloride (BAC)) was added to the waste sulphite liquor and the stirring was continued for 20 minutes. Then the resulting precipitate was filtered. The result is as follows:

| BAC Chemical equivalent ratio Al/Cl | Amount (g.) of BAC aqueous solution containing 20% as $Al_2O_3$ | Degree of precipitation (percent) |
|---|---|---|
| 6 | 4 | 76.0 |
| 6 | 6 | 81.2 |
| 6 | 7 | 85.8 |
| 6 | 8 | 92.5 |
| 6 | 9 | 97.6 |
| 6 | 10 | 99.8 |
| 2.7 | 4 | 69.0 |
| 2.7 | 6 | 83.2 |
| 2.7 | 7 | 92.1 |
| 2.7 | 8 | 95.3 |
| 2.7 | 9 | 96.0 |

The consumption of potassium permanganate was from 430 to 460 p.p.m. in respect of the treated liquor as compared with 2280 p.p.m. in respect of the initial liquor, both as diluted with 100 times water.

The transmittancy of the liquor after the treatment was from 78 to 82% while that of the original waste liquor as diluted to 0.1% of calcium lignosulphonate content was 75%.

*Example 2*

Thirty-two grams of a 5% (as $Al_2O_3$) solution of a basic aluminium chloride containing 21.10% of $Al_2O_3$ and 7.13% of Cl and having a chemical equivalent ratio (Al/Cl) of 6.17 were added to 100 cc. of waste sulphite liquor (total solid content 13.4 g., sugar content 3.3 g., calcium lignosulphonate content 8 g., CaO 1.25 g., pH adjusted to 4.45) while stirring at 80° C. After 5 minutes the resulting precipitate was filtered requiring 6 minutes and there were obtained 23 g. of a cake containing 63% of water and 110 cc. of a clear pale yellowish filtrate containing 3.1 g. sugar and 1.23 g. CaO. The cake was dried to obtain 8.5 g. of a blackish brown solid material containing 1.5 g. of $Al_2O_3$. The degree of precipitation was 100%.

The transmittancy of the filtrate was 81.5% while that of the original waste liquor as diluted to 0.1% of calcium lignosulfonate content was 75%. The consumption of potassium permanganate was 430 p.p.m. in respect of the filtrate as compared with 2280 p.p.m. in respect of the original waste sulphite liquor both diluted with 100 times water.

*Example 3*

Seventeen grams of a 10% (as $Al_2O_3$) solution of a basic aluminium chloride containing 14.5% of $Al_2O_3$ and 11.15% of Cl and having a chemical equivalent ratio (Al/Cl) of 2.7 were added to 100 cc. of waste sulphite liquor (total solid content 12.0 g., calcium lignosulphonate content 7.1 g., sugar content 3 g., CaO 1.14 g., pH 2.80) while stirring at 30° C. After 15 minutes the resulting precipitate was filtered requiring 25 minutes to obtain 85 cc. of a clear pale yellowish filtrate containing 2.9 g. of sugar and 1.12 g. of CaO, and 23.5 g. of a filter cake containing 69.2% of water. The cake was dried to obtain 7.9 g. of a blackish brown solid material containing $Al_2O_3$ 1.62 g. The degree of precipitation was 96.5%.

The transmittancy of the filtrate was 78.2% while that of the original waste sulphite liquor as diluted to 0.1% of calcium lignosulphonate content was 79%. The consumption of potassium permanganate was 460 p.p.m. in respect of the filtrate as compared with 2050 p.p.m. in respect of the original waste sulphite liquor diluted with 100 times water.

*Example 4*

Thirty-six grams of a 5% (as $Al_2O_3$) solution of a mixture of basic aluminium chloride and basic iron chloride containing 20.0% of $Al_2O_3$, 3.33% of $Fe_2O_3$ and 14.15% of Cl and having a chemical equivalent ratio (Al+Fe/Cl) of 4.03 were added to 100 cc. of waste sulphite liquor (total solid content 15.4 g., calcium lignosulphonate content 9 g., sugar content 3.7 g., pH adjusted to 5.0) while stirring at 60° C. After 10 minutes the resulting precipitate was filtered requiring 15 minutes to obtain 108 cc. of a clear pale yellowish filtrate containing 3.6 g. of sugar and 23 g. of a filter cake containing 64% of water. The cake was dried to obtain 8.6 g. of a blackish brown solid material containing $Al_2O_3$ 1.62 g. and $Fe_2O_3$ 0.27 g. The degree of precipitation was 97.8%.

The transmittancy of the filtrate was 75.7% while that of the original waste sulphite liquor as diluted to 0.1% of calcium lignosulphonate content was 70.5%. The consumption of potassium permanganate was 420 p.p.m. in respect of the filtrate as compared with 2550 p.p.m. in respect of the original waste sulphite liquor diluted with 100 times water.

*Example 5*

Seventy grams of a 5% (as $Al_2O_3$) solution of a basic aluminium nitrate containing 8.4% of $Al_2O_3$ and 6.11% of $NO_3$ and having a chemical equivalent ratio (Al/$NO_3$) of 5.02 were added to 200 cc. of waste sulphite liquor (total solid content 26.8 g., calcium lignosulphonate content 16 g., sugar content 6.6 g., pH adjusted to 4.5) while stirring at 25° C. After 20 minutes the resulting precipitate was filtered to obtain 210 cc. of a clear pale yellowish filtrate containing 6.55 g. of sugar and 50 g. of a filter cake containing 64% of water. The cake was dried to obtain 17 g. of a blackish brown solid material containing $Al_2O_3$ 3.47 g. The degree of precipitation was 100%.

The transmittancy of the filtrate was 81% while that of the original waste sulphite liquor as diluted to 0.1% of calcium lignosulphonate content was 75%. The consumption of potassium permanganate was 390 p.p.m. in respect to the filtrate as compared with 2280 p.p.m. in respect of the original waste sulphite liquor diluted with 100 times water.

*Example 6*

Twenty grams of a 10% (as $Al_2O_3$) solution of a basic aluminium chloride containing 14.94% of $Al_2O_3$ and 11.60% of Cl and having a chemical equivalent ratio (Al/Cl) of 2.7 were added to 100 cc. of waste liquor (total solid content 15.6 g., sodium lignocarboxylate content 8 g., pH adjusted to 8–9) resulting from soda pulping process. After 12 minutes of stirring at 50° C. the precipitate was filtered to obtain 90 cc. of almost transparent filtrate and 23.5 g. of a cake containing 68% of water. The cake was dried to obtain 7.5 g. of ocherous solid material. The degree of precipitation was 82%.

*Example 7*

250 g. of a 2% (as $Al_2O_3$) solution of a basic aluminium chloride containing 14.94% of $Al_2O_3$ and 11.60% of Cl and having a chemical equivalent ratio (Al/Cl) of 2.7 were added to 500 cc. of waste semi-chemical pulp cooking liquor (total solid content 38 g., sodium lignosulphonate content 22.5 g., pH 7.6) resulting from the neutral sodium sulphite process. After 3 minutes of stirring at 100° C. the precipitate was filtered requiring 5 minutes to obtain 670 cc. of a pale yellowish clear filtrate and 52 g. of a filter cake containing 61.0% of water. The cake was dried to obtain 20 g. of a blackish brown solid material. The degree of precipitation was 92%.

The consumption of potassium permanganate was only 120 p.p.m. in respect of the filtrate as compared with 1620 p.p.m. in respect of the original waste liquor diluted with 100 times water.

*Example 8*

33.8 g. of a 5% (as $Al_2O_3$) solution of a basic aluminium nitrate containing 21.10% of $Al_2O_3$ and 7.13% of $NO_3$ and having a chemical equivalent ratio (Al/$NO_3$) of 6.0 were added to 100 cc. of waste sulphite liquor (total solid content 14 g., magnesium lignosulfonate content 8 g., sugar content 3.4 g., pH adjusted to 5.44) while stirring at 65° C. After 10 minutes the resulting precipitate was filtered and there were obtained 12.5 g. of a cake containing 65.07% of water and 108.1 g. of a clear pale yellowish filtrate containing 3.2 g. of sugar. The cake was dried to obtain 7.3 g., of a blackish brown solid material which contains $Al_2O_3$ 1.6 g. The degree of precipitation was 89.02%.

The transmittancy of the filtrate was 85.5% while that of the original waste liquor was 8.5%. The consumption of potassium permanganate was 504.0 p.p.m. in respect of the filtrate as compared with 2040.3 p.p.m. in respect of the original waste sulphite liquor diluted with 100 times water.

*Example 9*

Four hundred grams of a 5% (as $Al_2O_3$) solution of a basic aluminium nitrate containing 8.4% of $Al_2O_3$ and 6.1% of NO₃ and having a chemical equivalent ratio (Al/NO₃) of 5.0 were added to 1000 cc. of waste liquor (total solid content 16%, Na₂O 4%, total organic content as precipitated by the addition of H₂SO₄ 3%, pH adjusted to 9.0) resulting from sulphate process. After 20 minutes of stirring at 30° C. the precipitate was filtered to obtain 1260 g. of clear pale yellowish filtrate and 135 g. of a cake containing 68% of water. The cake was dried to obtain 90 g. of solid material. The degree of precipitation was 94%.

*Example 10*

Basic aluminium chloride having a chemical equivalent ratio (Al/Cl) of 3.3 was added to 1000 cc. of waste sulfite liquor having various solid content in the ratio that the solid content in the waste liquor is 5 times BAC (as Al₂O₃).

After 5 minutes of stirring and 30 minutes of standing at 20° C., the transmittancy and the consumption of potassium permanganate of the original waste liquor and the filtrate were measured. The result is as follows:

| Total solid content (g./l.) | Amount (as Al₂O₃) of BAC aqueous solution containing 10% as Al₂O₃ | Transmittancy* (percent) | | Consumption of KMnO₄, p.p.m. | |
|---|---|---|---|---|---|
| | | Original liquor | Filtrate | Original liquor | Filtrate |
| 1.0 | 0.2 | 0 | 93 | 2,900 | 1,300 |
| 2.0 | 0.4 | 0 | 89 | -------- | 2,990 |
| 5.0 | 1.0 | 0 | 85 | 14,400 | 7,100 |
| 10.0 | 2.0 | 0 | 92 | -------- | 16,200 |
| 20.0 | 4.0 | 0 | 85 | -------- | 41,500 |
| 50.0 | 10.0 | 0 | 85 | 155,000 | 85,000 |

* Each original liquor was set zero as standard.

*Example 11*

Twenty-six grams of a 10% (as Fe₂O₃) solution of a fresh basic ferric chloride containing 12.0% of Fe₂O₃ and 5.3% of Cl and having a chemical equivalent ratio (Fe/Cl) of 3.1 were added to 100 cc. of waste sulphite liquor (total solid content 12.0 g., calcium lignosulphonate content 7.1 g., sugar content 3.0 g., pH 2.6) while stirring at 30° C. After 15 minutes the resulting precipitate was filtered to obtain 92 cc. of a clear pale yellowish filtrate containing sugar of 2.9 g. and 27 g. of a filter cake containing 69.2% of water. The cake was dried to obtain 9.5 g. of a blackish brown solid material containing 2.5 g. Fe₂O₃. The degree of precipitation was 91%.

The transmittancy of the filtrate was 74.5% while that of the original waste sulphite liquor as diluted to 0.1% of calcium lignosulphonate content was 79%. The consumption of potassium permanganate was 520 p.pm. in respect of the filtrate as compared with 2050 p.p.m. in respect of the original waste sulphite liquor diluted with 100 times water.

*Example 12*

25 grams of a 5% (as Al₂O₃) solution of a basic aluminium chloride containing 20.0% of Al₂O₃ and 9.8% of Cl and having a chemical equivalent ratio of (Al/Cl) of 4.28 were added together with 0.1 g. of NaCl to 250 cc. of waste sulphite liquor (total solid content 21.25 g., calcium lignosulphonate content 12.5 g., sugar content 5.4 g., CaO 2.0 g., pH adjusted to 4.0), while stirring at 60° C. After 10 minutes the resulting precipitate was filtered and there were obtained 19.4 g. of a cake containing 62% of water and 265 cc. of a clear pale yellowish filtrate containing 5.3 g. of sugar and CaO 2.0 g. The rate and the time of this filtration were 900 cc./100 cm.² hr. and 13 minutes respectively. The cake was dried to obtain 11 g. of a blackish brown solid material containing Al₂O₃ 1.2 g. The degree of precipitation was 100%.

The transmittancy of the filtrate was 84% while that of the original liquor as diluted to 0.1% of calcium lignosulphonate content was 82%. The consumption of potassium permanganate was 360 p.p.m. in respect of the filtrate as compared with 1620 p.p.m. in respect of the original waste sulphite liquor both diluted with 100 times water.

When NaCl was not added in this example, the amount of BAC to accomplish the same degree of precipitation of 100% was 60 g.

What I claim is:

1. A method for separating lignin from a lignin-containing aqueous solution resulting, as waste liquor, from the manufacture of pulp by the sulphite process, alkali process or semi-chemical process, which comprises adding to the solution a basic salt of the formula:

$$M_n(OH)_m X_{3n-m} \qquad (I)$$

wherein M is a metal selected from Al and trivalent Fe, $n$ is a number of from 1 to 20 inclusive, X is a monovalent anion selected from the group consisting of Cl, Br, I, NO₃ and CH₃COO, $3n > m$ and the chemical equivalent ratio M/X is from 1.5 to 200, thereby converting water-soluble lignin material in said aqueous solution into water-insoluble precipitate, and recovering the latter.

2. A method as claimed in claim 1 wherein the basic salt is added to the aqueous solution in an amount of from ½ to 1/10 part (calculated as Al₂O₃) per part of the solid lignin content in said solution.

3. A method as claimed in claim 1 wherein the pH of the aqueous solution to be treated is from 2 to 9.

4. A method as claimed in claim 1 wherein, in the Formula I, M is aluminium and $n$ is 4–10 inclusive.

5. A method as claimed in claim 1 wherein, in the Formula I, M is trivalent Fe and $n$ is 1 to 2 inclusive.

6. A method as claimed in claim 1 wherein an alkali metal salt having an monovalent anion as defined in claim 1 is added to the lignin-containing aqueous solution, in addition to the basic salt.

7. A method as claimed in claim 6 wherein the alkali metal salt is added to the lignin-containing solution in an amount of from 0.1% to 10.0% based on the weight of the solid lignin content in said solution.

8. A method as claimed in claim 6 wherein the alkali metal salt is selected from the group consisting of NaCl, KCl, NaNO₃ and KNO₃.

References Cited by the Examiner

UNITED STATES PATENTS

| | | | |
|---|---|---|---|
| 2,935,504 | 5/1960 | King et al. | 260—124 |
| 2,949,448 | 8/1960 | Toppel | 260—124 |

CHARLES B. PARKER, *Primary Examiner.*

D. R. PHILLIPS, *Assistant Examiner.*